United States Patent
Todeschini et al.

(10) Patent No.: US 10,440,513 B2
(45) Date of Patent: *Oct. 8, 2019

(54) PICK AND PUT LOCATION VERIFICATION UTILIZING RF RECEIVED SIGNAL STRENGTH

(71) Applicant: INTERMEC, INC., Lynnwood, WA (US)

(72) Inventors: Erik Todeschini, Morristown, NJ (US); Mehul Patel, Morristown, NJ (US)

(73) Assignee: INTERMEC, INC., Lynnwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/142,088

(22) Filed: Sep. 26, 2018

(65) Prior Publication Data

US 2019/0028842 A1 Jan. 24, 2019

Related U.S. Application Data

(63) Continuation of application No. 15/585,844, filed on May 3, 2017, now Pat. No. 10,136,259.

(51) Int. Cl.
*H04W 4/02* (2018.01)
*G01S 5/14* (2006.01)
(Continued)

(52) U.S. Cl.
CPC .......... *H04W 4/025* (2013.01); *G01S 5/0252* (2013.01); *G01S 5/14* (2013.01); *G06Q 10/087* (2013.01);
(Continued)

(58) Field of Classification Search
CPC ..... H04W 4/025; H04W 4/008; H04W 4/023; H04W 48/16; H04B 17/318; G01S 5/0252; G06Q 10/087; H04L 61/6022
(Continued)

(56) References Cited

U.S. PATENT DOCUMENTS 3,572,810 A * 3/1971 Arakelian ............ B62D 47/003
180/315
7,383,284 B2 * 6/2008 Heinrichs ............ G06Q 10/087
(Continued)

OTHER PUBLICATIONS

Zhiqiang, HE et al. "A proposal of interaction system between visitor and collection in museum hall by iBeacon." The 10th International Conference on Computer Science & Education (ICCSE 2015), Jul. 22-24, 2015, pp. 1-4.
(Continued)

*Primary Examiner* — Omar Casillashernandez
(74) *Attorney, Agent, or Firm* — Oliff PLC; R. Brian Drozd

(57) ABSTRACT

An inventory tracking system includes a plurality of emitters that each emit a wireless signal and are placed at known locations relative to a plurality of storage areas in a warehouse, including a first storage area for storage of a specified item. The system further includes a mobile device that travels with a material handler. The mobile device: receives a first wireless signal from a first emitter that is one of the plurality of emitters; calculates a first distance between the material handler and the first emitter based on the first wireless signal; determines that the material handler is located at a stocking location for the first storage area based on the first distance and the known location of the first emitter; and sends a notification indicating that the material handler is at the stocking location for the first storage area.

19 Claims, 4 Drawing Sheets

(51) Int. Cl.
*H04B 17/318* (2015.01)
*H04W 4/80* (2018.01)
*G01S 5/02* (2010.01)
*G06Q 10/08* (2012.01)
*H04L 29/12* (2006.01)
*H04W 48/16* (2009.01)
*G06Q 50/28* (2012.01)

(52) U.S. Cl.
CPC ....... *H04B 17/318* (2015.01); *H04L 61/6022* (2013.01); *H04W 4/023* (2013.01); *H04W 4/80* (2018.02); *H04W 48/16* (2013.01); *G06Q 50/28* (2013.01)

(58) Field of Classification Search
USPC .................................. 340/539.12; 30/539.12
See application file for complete search history.

(56) References Cited

U.S. PATENT DOCUMENTS

| | | | |
|---|---|---|---|
| 8,712,690 | B1 | 4/2014 | White et al. |
| 9,756,607 | B1* | 9/2017 | DeLuca ............... H04W 68/02 |
| 9,800,429 | B2* | 10/2017 | Crayford ............. H04L 12/2803 |
| 9,811,802 | B1* | 11/2017 | Curlander ............ G06K 9/00 |
| 2002/0174001 | A1* | 11/2002 | Henry ................. G06Q 10/087 |
| | | | 705/28 |
| 2003/0028323 | A1 | 2/2003 | Zeitler et al. |
| 2003/0216969 | A1* | 11/2003 | Bauer ................. G06K 7/0008 |
| | | | 705/22 |
| 2006/0186201 | A1* | 8/2006 | Hart ................... G06Q 10/06 |
| | | | 235/385 |
| 2007/0156536 | A1* | 7/2007 | Alfandary ........... G06Q 10/087 |
| | | | 705/22 |
| 2012/0235812 | A1* | 9/2012 | Maia .................. G01S 13/08 |
| | | | 340/539.13 |
| 2013/0203436 | A1 | 8/2013 | Hohteri et al. |
| 2014/0111380 | A1 | 4/2014 | Gibbs et al. |
| 2015/0005011 | A1* | 1/2015 | Nehrenz .............. H04W 4/02 |
| | | | 455/456.3 |
| 2015/0019391 | A1* | 1/2015 | Kumar ................ G07G 1/0036 |
| | | | 705/28 |
| 2015/0119071 | A1* | 4/2015 | Basha ................. G01S 1/68 |
| | | | 455/456.1 |
| 2015/0134403 | A1* | 5/2015 | Schwartz ............ G06Q 10/087 |
| | | | 705/7.29 |
| 2016/0142868 | A1* | 5/2016 | Kulkarni ............. H01Q 1/24 |
| | | | 455/456.5 |
| 2016/0350787 | A1* | 12/2016 | Taylor ................ G06Q 30/0223 |
| 2017/0185933 | A1* | 6/2017 | Adulyasak .......... G06Q 10/087 |
| 2017/0217683 | A1* | 8/2017 | Lyon .................. G06Q 10/0875 |

OTHER PUBLICATIONS

Sep. 28, 2018 Search Report issued in European Patent Application No. 18170469.3.

\* cited by examiner

PICK AND PUT LOCATION VERIFICATION UTILIZING RF RECEIVED SIGNAL STRENGTH

CROSS-REFERENCE TO RELATED APPLICATION

This is a Continuation of application Ser. No. 15/585,484 filed May 3, 2017. The disclosure of the prior application is hereby incorporated by reference herein in its entirety.

BACKGROUND

During order fulfillment operations such as stocking and picking in a storage location such as a warehouse, a common source of inaccuracy is caused by a stocker or material handler stocking (or picking) a product at an incorrect location.

Some systems, such as pick to voice, address this by requiring the material handler to read a confirmation code that is printed at each location to verify that they are in fact at the correct spot, picking or stocking the correct item. This solution however, is fallible as it is common for the material handlers to memorize these confirmation codes and speak back the correct code to the system while picking/placing at an incorrect location.

SUMMARY

The above problems are solved in several embodiments by a warehouse including a plurality of storage areas where items are stored, and a plurality of emitters that each emit a wireless signal and are placed at known locations relative to the plurality of storage areas, including a first storage area that is one of the plurality of storage areas, the first storage area being for storage of a specified item. The warehouse further includes a mobile device that travels with a material handler. The mobile device: receives a first wireless signal from a first emitter that is one of the plurality of emitters; calculates a first distance between the material handler and the first emitter based on the first wireless signal; determines that the material handler is located at a stocking location for the first storage area based on the first distance and the known location of the first emitter; and sends a message indicating that the material handler is at the stocking location for the first storage area.

An inventory tracking system includes a plurality of emitters that each emit a wireless signal and are placed at known locations relative to a plurality of storage areas in a warehouse, including a first storage area for storage of a specified item. The system further includes a mobile device that travels with a material handler. The mobile device: receives a first wireless signal from a first emitter that is one of the plurality of emitters; calculates a first distance between the material handler and the first emitter based on the first wireless signal; determines that the material handler is located at a stocking location for the first storage area based on the first distance and the known location of the first emitter; and sends a message indicating that the material handler is at the stocking location for the first storage area.

In some embodiments, the mobile device determines that the material handler is located at the stocking location for the first storage area when the first distance is below a predetermined threshold, and determines that the material handler is located at the stocking location for a predetermined period of time before sending the message. In some embodiments, the mobile device receives a second wireless signal from a second emitter that is one of the plurality of emitters, calculates a second distance to the second emitter based on the second wireless signal, and uses the second distance and the known location of the second emitter to determine that the material handler is located at the stocking location for the first storage area. In some embodiments, the mobile device determines the location of the material handler using multilateration. In some embodiments, the mobile device receives a third wireless signal from a third emitter that is one of the plurality of emitters, calculates a third distance to the third emitter based on the third wireless signal, and uses the third distance and the known location of the third emitter to determine that the material handler is located at the stocking location for the first storage area. In some embodiments, the mobile device calculates the first distance based on a received strength of the first wireless signal. In some embodiments, the mobile device calculates the first distance based on the following formula (1): (1) $RSSI=-10*n*\log(d)+A$, where: d is the distance, A is a calibrated transmission power, n is a signal propagation constant, and RSSI is the received strength of the first wireless signal. In some embodiments, the mobile device calculates the first distance based on a time of flight of the first wireless signal. In some embodiments, the mobile device determines an identity of the first emitter based on the first wireless signal, and uses the identity to determine the known location of the first emitter. In some embodiments, the mobile device determines the identity based on a MAC (media access control) address of the first emitter, obtained from the first wireless signal. In some embodiments, the mobile device determines the identity based on a beacon ID of the first emitter, obtained from the first wireless signal. In some embodiments, the plurality of emitters are Bluetooth low-energy (BLE) beacons. In some embodiments, the message includes an instruction to the material handler to remove a quantity of the specified item from the first storage area, or add a quantity of the specified item to the first storage area. In some embodiments, the mobile device instructs the material handler to go to the stocking location for the first storage area prior to receiving the first wireless signal.

Embodiments herein provide a solution to the above-described stocking problems by using received signal strength of wireless (sometimes radio-frequency) beacons as a confirmation of correct pick location. Several embodiments utilize small, inexpensive Bluetooth low-energy (BLE) beacons that can be mounted at each pick location. These beacons need not be equipped with any other features other than a simple BLE radio, making them quite inexpensive and useful in other ways, such as indoor positioning for other purposes such as tracking and productivity metrics analysis of material handlers. Some embodiments also use a smart device that is carried by the material handler or mounted on the forklift that contains a BLE radio. When a material handler is directed to their next stocking location (via voice, light or other mechanism) they navigate their forklift to the stocking location. Their smart device software is aware of the Bluetooth MAC address that belongs to the beacon located at the next stocking location.

This mapping is done ahead of time when the warehouse is outfitted with these beacons. The smart device listens to all BLE devices until it finds the one it is looking for. Once found, it monitors the received signal strength of the beacon's advertising packet. This packet contains the transmit power of the beacon, which along with the received signal strength can be used to estimate the distance to the beacon, as RF signal strength decreases in a predictable/measureable way the greater the separation between the transmitter and the receiver. It is this property that is the basis of some types of indoor positioning techniques, such as Multilateration and RF fingerprinting.

As the material handler approaches the stocking location, the received signal strength of the beacon increases. The signal strength and transmit power are used to compute a distance to the beacon. Once the material handler has sustained a distance to the beacon below a predetermined threshold (e.g. 1.5 meters) for a predetermined amount of time (e.g. 5 seconds) the business logic app (or other software) running on the material handler's smart phone (or other mobile device) will consider the location to be verified. Once the location has been confirmed, the material handler can be told the pick count (via software graphical-user interface (GUI), verbally, or other means) and can continue their stocking operation.

DETAILED DESCRIPTION OF EMBODIMENTS

Figure 1:
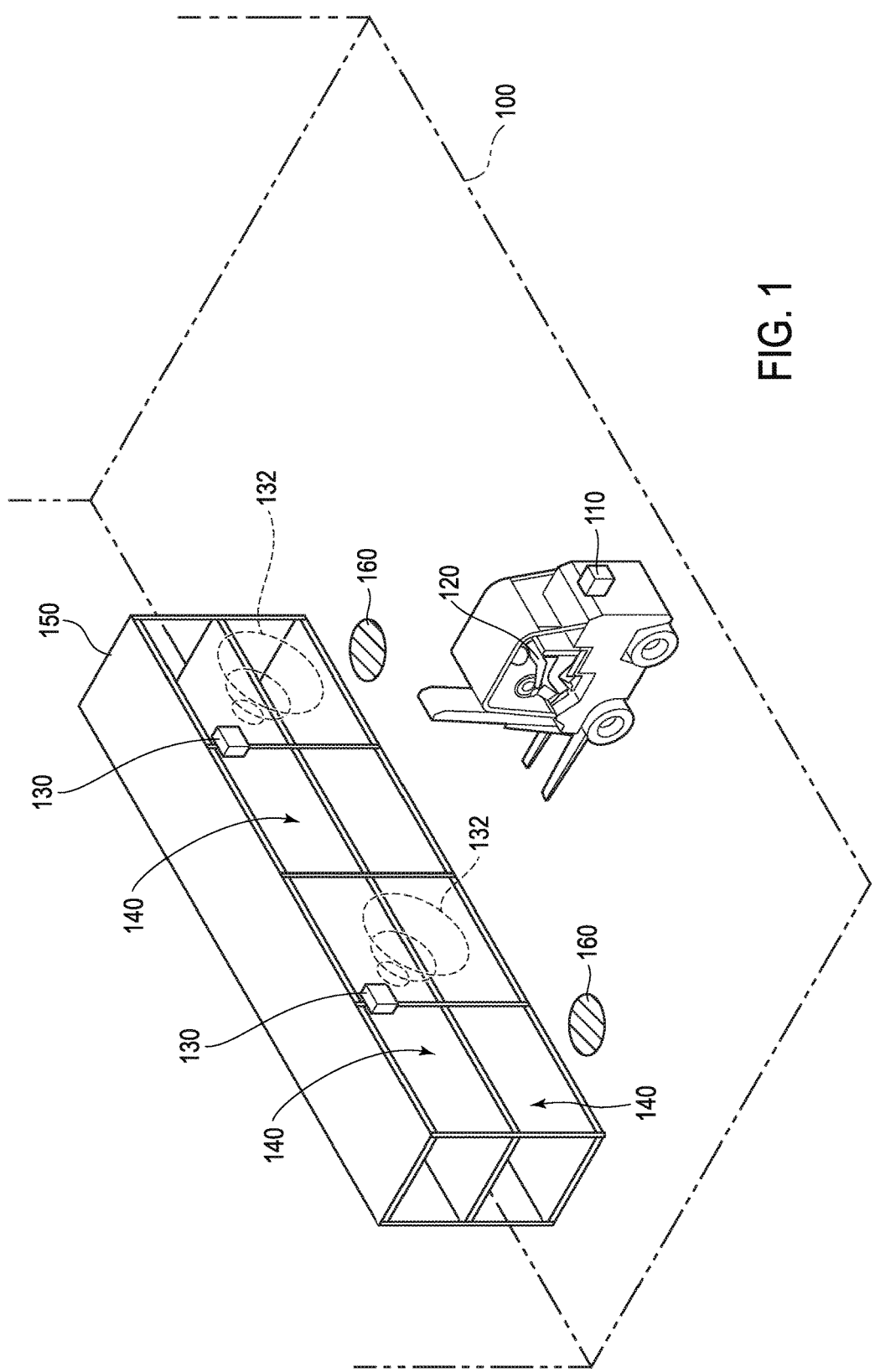
FIG. 1 is an isometric drawing of a warehouse according to one embodiment.
Figure 2:
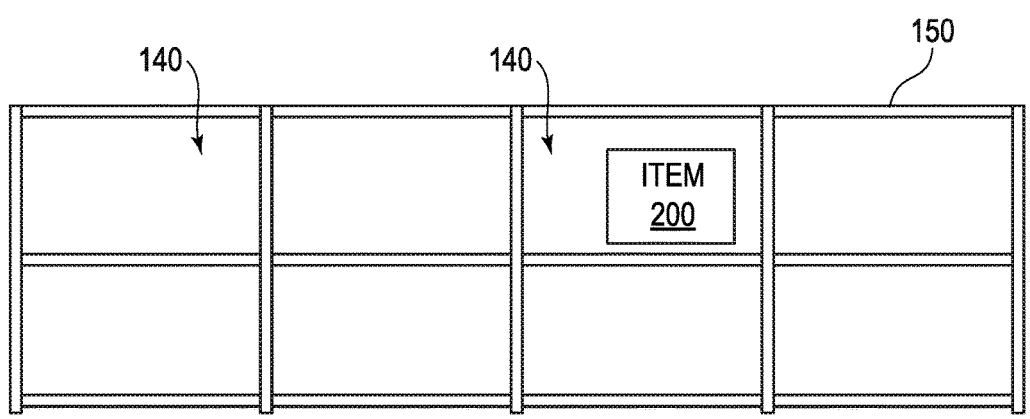
FIG. 2 is a two-dimensional drawing of a storage area according to one embodiment.

FIG. 1 shows a warehouse 100 according to one embodiment, implementing an embodiment of an inventory management system 160 described herein. Warehouse 100 contains a rack 150 where items, such as parts or merchandise, are stored. Rack 150 includes a plurality of storage areas 140, which in some embodiments are particular locations on a shelf of rack 150. As shown in FIG. 2, each storage area 140 contains a specified item 200 stored therein. Warehouse 100 contains several emitters 130, whose locations are known relative to the storage areas 140. Emitters 130 emit wireless signals 132. In this embodiment, emitters 130 are mounted on rack 150.

In some embodiments, emitters 130 are small BLE beacon devices with power supplies. An off-the-shelf BLE beacon is used in some embodiments, and almost any type of wireless beacon can be used. In some embodiments, an emitter 130 is mounted at each stocking location 160, for each storage area 140, and its BLE MAC (media access control) address is stored in a database and associated with that particular stocking location 160. In several embodiments, even where an emitter 130 is not located at each stocking location 160, the relative location of emitters 130 relative to stocking locations 160 or storage areas 140 is known.

Items 200 are removed from and stocked in storage areas 140 by a material handler 120. In this embodiment, material handler 120 is a forklift operator. However, in other embodiments, material handler 120 is a worker without a vehicle, a machine, a robot, or a drone. Material handler 120 can be anything capable of stowing items 200 in or retrieving items 200 from storage areas 140. In order to retrieve (pick) or stock an item 200 from a particular storage area 140, material handler 120 should be located at the storage location 160 associated with that particular storage area 140. Material handler 120 is equipped with a mobile device 110 that travels with the material handler 120 and determines the location of material handler 120 relative to storage areas 140 and storage locations 160.

Figure 3:
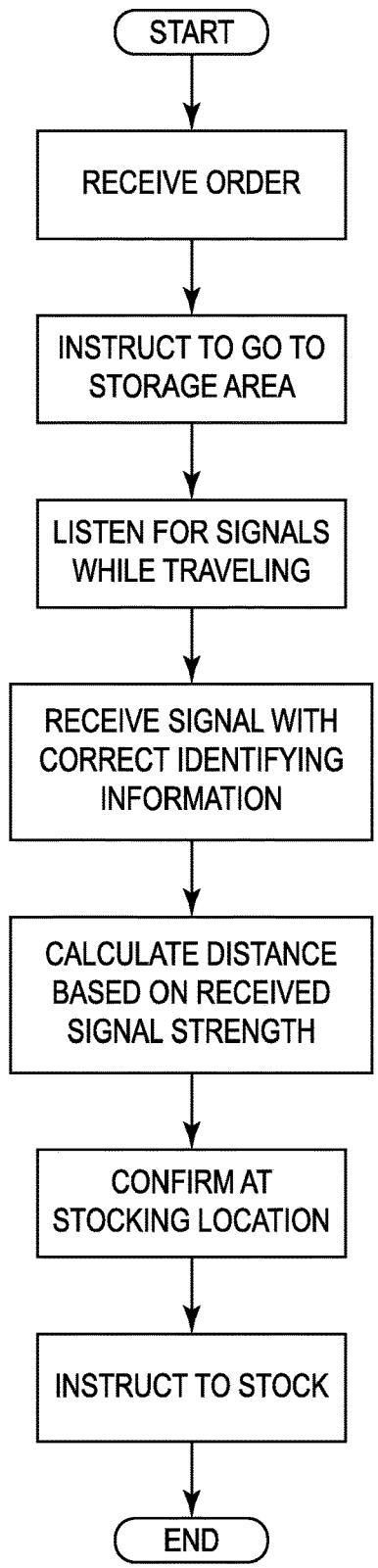
FIG. 3 is a flow chart of functions of a mobile device according to one embodiment.

In this embodiment, mobile device 110 has a processor executing software or instructions on a computer-readable storage medium. As shown in FIG. 3, when an order is received by mobile device 110, mobile device 110 instructs material handler 120 to go to stocking location 160 associated with the storage area 140 containing a specified item 200 that is the subject of the order. The software instructs mobile device 110 to listen for signals 132 from all emitters 130 using a receiver connected thereto. Material handler 120 then travels toward the stocking location 160 indicated by mobile device 110. Meanwhile, mobile device 110 continues to listen for signals 132 in its vicinity while looking for a particular Bluetooth MAC address (or other identifying information obtained from signals 132) corresponding to the intended emitter 130 (which corresponds to the desired stocking location 160, storage area 140, and item 200). When found, mobile device 110 reads the transmit power contained within the advertisement packet of emitter 130 and notes the received signal strength of the signal 132 emitted from emitter 130. In some embodiments, mobile device then calculates the approximate distance to emitter 130 using the following formula:

$$\text{RSSI} = -10 * n * \log(d) + A \quad (1)$$

where d=distance, A=calibrated tx Power, n=signal propagation constant and [RSSI]=dBm.

The signal propagation constant n is approximately 2 in free space, but n can be adjusted for measurements through walls, as a wall could reduce the received signal strength by approximately ~3 dBm. The calibrated tx (transmission) Power is the measured signal strength at one meter and is what emitter 130 transmits within its advertisement packet (e.g. signal 132) in several embodiments.

In other embodiments, such as those using ultra-wide band beacons for emitters 130, mobile device 110 calculates the time of flight of the signal 132 to determine the distance to the emitter 130.

In some embodiments, the software on mobile device 110 continuously calculates this distance each time it reads an advertisement packet in a signal 132. Once the calculated distance is at or below a certain threshold value (e.g. 1.5 meters) for a certain amount of time (e.g. 5 seconds) the software signals that the stocking location has been confirmed. The software (in some embodiments a business logic application) then communicates the pick or stock quantity to the material handler and the stocking operation continues. After the quantity is messages to the material handler, the material handler performs the stocking operation (i.e. loading the quantity of the specified item 200 into the storage area 140, or removing the quantity of the specified item 200 from the storage area 140). The threshold values used for this pick confirmation are configurable for the specific use case. Storage areas 140 containing bins that are further apart might allow for a greater distance from an emitter to confirm that the material handler 120 is in the desired stocking location 160, where denser storage areas 140 may require a tighter tolerance. In some embodiments, this system is used to increase the accuracy of many different types of picking & stocking systems (pick to voice, pick to light, etc.).

Figure 4:
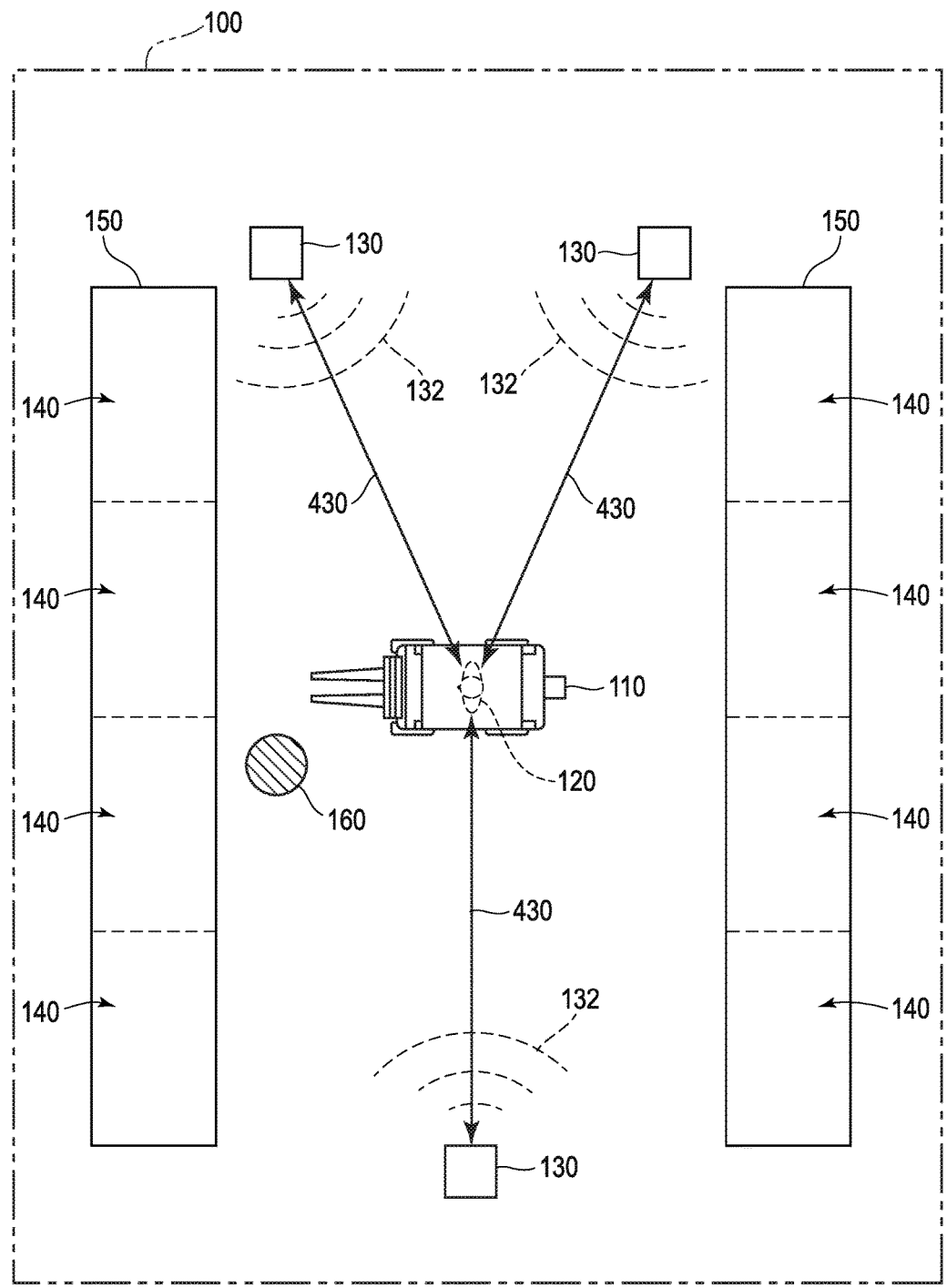
FIG. 4 is a diagram of a warehouse according to one embodiment.

In another embodiment, emitters 130 are not placed at every stocking location 160, but are distributed throughout warehouse 150 at locations relative to stocking locations 160 that are known. In this embodiment, mobile device 110 uses the calculated distances to and identities of two or more emitters 130 to determine the location of material handler 120 within warehouse 100 (and relative to stocking locations 160). This is achieved by receiving signals 132 from two or more emitters 130 and multilateration. More accurate location information can be obtained by receiving signals 132 from three or more emitters 130 and multilateration (i.e. using calculated distances and identities of three or more emitters). Such an embodiment is shown in FIG. 4, where three emitters 130 are placed in warehouse 100, and mobile device 110 calculates distances 430 to each of the three emitters. Mobile device 110 then calculates location of material handler 120 based on known locations of emitters 130. This determined location is then used to confirm that material handler 120 is at desired stocking location 160, so that the stocking operation can proceed.

The warehouse, system, and mobile device functionality described herein represent a technological improvement to the field of digital inventory management. As discussed previously, various computerized solutions have been devised to prevent errors by material handlers in stocking and retrieving goods in storage. However, these solutions are easily circumvented. The present systems solve this problem using a property unique to the field of wireless communication; namely, that a distance to an emitter can be determined based on received signal strength. Accordingly, this is a solution necessarily rooted in technology.

Although the invention has been described with reference to embodiments herein, those embodiments do not limit the scope of the invention. Modifications to those embodiments or different embodiments may fall within the scope of the invention.

What is claimed is:

1. A method, comprising:
  receiving, by a mobile device, a first wireless signal from a first emitter;
  calculating, by the mobile device, a first distance between the mobile device and the first emitter based on the first wireless signal;
  determining, by the mobile device, that the mobile device is located at a stocking location associated with a first storage area based on the first distance between the mobile device and the first emitter and a comparison of the first distance with a threshold distance, wherein the threshold distance is configurable based on a density of storage bins in the first storage area; and
  sending a notification, by the mobile device indicating that the mobile device is at the stocking location for the first storage area in response to the determining that the mobile device is located at the stocking location.

2. The method of claim 1, wherein the mobile device determines that a material handler is located at the stocking location of the first storage area when the first distance is below the threshold distance, and determines that the material handler is located at the stocking location for a predetermined period of time before sending the notification.

3. The method of claim 1, wherein the mobile device calculates the first distance based on a received strength of the first wireless signal.

4. The method of claim 3, wherein the mobile device calculates the first distance based on a function of a calibrated transmission power and a
  received signal strength indicator of the first wireless signal.

5. The method of claim 1, further comprises determining an identity of the first emitter based on the first wireless signal, and using the identity to determine the known location of the first emitter.

6. The method of claim 1, further comprising instructing a material handler to go to the stocking location for the first storage area prior to receiving the first wireless signal.

7. A method comprising:
  receiving, at a mobile device that travels with a material handler, a first wireless signal from a first emitter of a plurality of emitters;
  calculating, by the mobile device, a first distance between the material handler and the first emitter based on the first wireless signal;
  determining, by the mobile device, that the material handler is located at a stocking location associated with a first storage area of a specified item based a comparison of the first distance with a threshold distance, wherein the threshold distance is configurable based on density of bins in the first storage area; and
  sending, by the mobile device, a message indicating that the material handler is at the stocking location for the first storage area.

8. The method of claim 7, wherein the mobile device determines that the material handler is located at the stocking location for the first storage area when the first distance is below the threshold distance, and determines that the material handler is located at the stocking location for a predetermined period of time before sending the message.

9. The method of claim 8, further comprising receiving a second wireless signal from a second emitter that is one of the plurality of emitters, calculates a second distance to the second emitter based on the second wireless signal, and using the second distance and the known location of the second emitter to determine that the material handler is located at the stocking location for the first storage area.

10. The method of claim 9, further comprising determining that the material handler is located at the stocking location for the first storage area using multilateration.

11. The method of claim 10, further comprising receiving a third wireless signal from a third emitter that is one of the plurality of emitters, calculates a third distance to the third emitter based on the third wireless signal, and uses the third distance and the known location of the third emitter to determine that the material handler is located at the stocking location for the first storage area.

12. The method of claim 9, wherein the mobile device calculates the first distance based on a received strength of the first wireless signal.

13. The method of claim 7, wherein the mobile device calculates the first distance based on a function of a calibrated transmission power and a
  received signal strength indicator of the first wireless signal.

14. The method of claim 9, wherein the mobile device calculates the first distance based on a time of flight of the first wireless signal.

15. The method of claim 7, further comprising determining an identity of the first emitter based on the first wireless signal, and using the identity to determine the known location of the first emitter.

16. The method of claim 15, wherein the mobile device determines the identity based on a MAC (media access control) address of the first emitter or based on a beacon ID of the first transmitter, obtained from the first wireless signal.

17. The method of claim 7, wherein the plurality of emitters are Bluetooth low-energy (BLE) beacons.

18. The method of claim 7, further comprising receiving, at a mobile device a message comprising an instruction to the material handler to remove a quantity of a specified item from the first storage area, or add a quantity of the specified item to the first storage area, the first storage area being for storage of the specified item.

19. A mobile device:
comprising an antenna; and
a processor configured to:
   receive, from the antenna, a first wireless signal from a first emitter of a plurality of emitters;
   calculate a first distance between the mobile device and the first emitter based on the first wireless signal;
   determine that the mobile device is located at a stocking location associated with a first storage area based on the first distance between the mobile device and the first emitter, a known location of the first emitter and a comparison of the first distance with a threshold distance that is configurable based on a density of the storage bins in the first storage area; and
   sending a notification, by the mobile device, indicating that the mobile device is at the stocking location for the first storage area in response to the determining that the mobile device is located at the stocking location.

\* \* \* \* \*